(12) United States Patent
Lee

(10) Patent No.: US 7,040,296 B2
(45) Date of Patent: May 9, 2006

(54) ENGINE START CONTROL SYSTEM AND A METHOD THEREOF

(75) Inventor: Woo Jik Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 66 days.

(21) Appl. No.: 10/747,910

(22) Filed: Dec. 29, 2003

(65) Prior Publication Data

US 2004/0244779 A1    Dec. 9, 2004

(30) Foreign Application Priority Data

Jun. 9, 2003    (KR) ............... 10-2003-0036864

(51) Int. Cl.
F02D 41/06    (2006.01)
(52) U.S. Cl. .................... 123/487; 123/491
(58) Field of Classification Search .......... 123/179.16, 123/179.17, 478, 487, 491, 527; 73/119 A
See application file for complete search history.

(56) References Cited

U.S. PATENT DOCUMENTS

| | | | | |
|---|---|---|---|---|
| 4,208,991 A | * | 6/1980 | Reddy | 123/491 |
| 5,146,882 A | * | 9/1992 | Brinkman et al. | 123/491 |
| 5,469,827 A | * | 11/1995 | Tomisawa | 123/491 |
| 5,577,482 A | * | 11/1996 | Nakashima et al. | 123/491 |
| 5,611,314 A | * | 3/1997 | Fuwa et al. | 123/491 |
| 6,223,730 B1 | * | 5/2001 | Hasegawa et al. | 123/491 |
| 6,257,207 B1 | * | 7/2001 | Inui et al. | 123/491 |

FOREIGN PATENT DOCUMENTS

JP    07-208235    8/1995

\* cited by examiner

*Primary Examiner*—Tony M. Argenbright
(74) *Attorney, Agent, or Firm*—Morgan Lewis & Bockius LLP

(57) ABSTRACT

An engine start control system provides at least one sensor detecting engine operating conditions, an injector, and a control unit. The control unit controls the injector based on signals of the at least one sensor and it is programmed to perform a control logic comprising, determining whether an accumulated number of cases in which engine start is determined to be delayed is greater than a predetermined reference value and controlling the injector to not inject fuel for a predetermined number of engine cycles.

30 Claims, 3 Drawing Sheets

ENGINE START CONTROL SYSTEM AND A METHOD THEREOF

CROSS-REFERENCE TO RELATED APPLICATIONS

This application claims priority to Korean Application No. 10-2003-0036864, filed Jun. 9, 2003, the disclosure of which is incorporated fully herein by reference.

FIELD OF THE INVENTION

Generally, the present invention relates to a vehicle engine start control system and method. More particularly, the system and method is capable of preventing a deterioration in startability and an increase of exhaust emissions because of leaked fuel.

BACKGROUND OF THE INVENTION

Typically, an LPI (LPG Injection) engine uses liquefied petroleum gas (LPG) as a fuel. The LPG is stored in a fuel tank in a liquid state and is pressurized by a fuel pump disposed in the fuel tank for injection into combustion chambers of an engine. An amount of fuel injected into the combustion chamber is determined based on various vehicle conditions.

If LPG is heated by the heat of an engine, its saturated vapor pressure increases rapidly, such that pressure in a fuel supply line also increases. In particular, after a vehicle has been driven for a long time, fuel exists in the fuel supply line and the engine has a lot of heat, therefore, the fuel pressure in the fuel supply line can rise very high. Such an increase in fuel pressure in the fuel supply line may cause the fuel to leak from a fuel injector. Furthermore, with aging of the fuel injector, leakage of fuel in the fuel injector can substantially increase.

The air/fuel mixture may become substantially rich because of the leaked fuel in a combustion chamber. When an amount of leaked fuel is small the air/fuel mixture is in a combustion range, but when the amount of leaked fuel is substantially large the air/fuel mixture goes beyond the combustion range, and start time is increased because of misfire. Furthermore, the leaked fuel may increase an amount of exhaust emissions, in particular, hydrocarbons.

In LPG engines, conventional fuel control does not consider the leaked fuel, so engine startability and emission characteristics are poor.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention provides an engine start control system and a method in which fuel injection is prohibited if a specific condition is satisfied, thereby improving engine startability and emission characteristics.

In a preferred embodiment the engine start control method comprises the steps of determining whether a predetermined control condition is satisfied and determining whether a counter value indicative of an accumulated number of engine start delays due to leaked fuel is greater than a predetermined reference value. Also included is injecting fuel and igniting an air/fuel mixture until an engine speed reaches a predetermined start determination engine speed, if it is determined that the counter value is not greater than the predetermined reference value. Also, determining whether an elapsed time for the engine speed to reach the predetermined start determination engine speed is greater than a predetermined target start time and increasing the counter value by 1 if the elapsed time is greater than the predetermined required starting time, and decreasing the counter value by 1 if the elapsed time is not greater than the predetermined target starting time. Furthermore, performing a leaked fuel reduction control logic, if it is determined that the counter value is greater than the predetermined reference value.

It is preferable that the predetermined control condition comprises a battery voltage being higher than a predetermined voltage, and each of differences between a coolant temperature, an intake air temperature, and a fuel temperature being less than a predetermined value.

It is also preferable that the predetermined reference value of the accumulated number of engine start delays is 10. Preferably, the predetermined start determination engine speed is determined based on a coolant temperature. It is also preferable that the predetermined target start time is determined based on a fuel temperature.

It is further preferable that the leaked fuel reduction control logic comprises controlling an injector to not inject fuel for a predetermined number of engine cycles. Decreasing the counter value by 1, if an engine speed reaches the predetermined start determination engine speed after the predetermined number of engine cycles. Increasing the counter value by 1, if the engine speed reaches the predetermined start determination engine speed after the predetermined number of engine cycles.

It is further preferable that the predetermined number of engine cycles is determined based on the counter value. It is still further preferable that the predetermined number of engine cycles is determined by a difference between the counter value and the predetermined reference value.

It is preferable that the leak fuel reduction control logic further comprises determining whether the counter value is equal to a predetermined maximum value and resetting the counter value to 0 and warning of a malfunction of the injector if it is determined that the counter value is equal to the predetermined maximum value.

In a preferred embodiment of the present invention, the engine start control system comprises an engine speed sensor, an injector, and a control unit. The engine speed sensor detects an engine speed, the injector injects fuel, and the control unit controls the injector based on a signal of the engine speed sensor. The control unit is programmed to perform a control method comprising determining whether a predetermined control condition is satisfied. Determining whether a counter value indicative of an accumulated number of engine start delays due to leaked fuel is greater than a predetermined reference value. Injecting fuel and igniting the air/fuel mixture until an engine speed reaches a predetermined start determination engine speed, if it is determined that the counter value is not greater than the predetermined reference value. Determining whether an elapsed time for the engine speed to reach the predetermined start determination engine speed is greater than a predetermined target start time. Increasing the counter value by 1 if the elapsed time is greater than the predetermined required starting time, and decreasing the counter value by 1 if the elapsed time is not greater than the predetermined target starting time.

Performing a leaked fuel reduction control logic, if it is determined that the counter value is greater than the predetermined reference value.

Preferably, the engine start control system further comprises a battery voltage sensor detecting a battery voltage and a coolant temperature sensor detecting a coolant temperature. Also included is a fuel temperature sensor detecting a fuel temperature. The predetermined control condition comprises a battery voltage being higher than a predetermined voltage, and each of differences between a coolant temperature, an intake air temperature, and a fuel temperature being less than a predetermined value. It is preferable that the predetermined reference value is 10.

Preferably, the engine start control system further comprises a coolant temperature sensor detecting a coolant temperature, wherein the predetermined start determination engine speed is determined based on a coolant temperature. Preferably, the engine start control system further comprises a fuel temperature sensor detecting a fuel temperature, and the predetermined target start time is determined based on a fuel temperature.

It is preferable that the leaked fuel reduction control logic comprises controlling the injector to not inject fuel for a predetermined number of engine cycles. Decreasing the counter value by 1 if an engine speed reaches the predetermined start determination engine speed after the predetermined number of engine cycles. Increasing the counter value by 1 if the engine speed reaches the predetermined start determination engine speed after the predetermined number of engine cycles. It is preferable the predetermined number of engine cycles is determined based on the counter value. It is further preferable that the predetermined number of engine cycles is determined by a difference between the counter value and the predetermined reference value.

It is preferable that the leak fuel reduction control logic further comprises determining whether the counter value is equal to a predetermined maximum value and resetting the counter value to 0 and warning of a malfunction of the injector if it is determined that the counter value is equal to the predetermined maximum value.

In another preferred embodiment of the present invention, the engine start control method comprises determining whether an accumulated number of cases in which engine start is determined to be delayed is greater than a predetermined reference value and controlling an injector to not inject fuel for a predetermined number of engine cycles.

It is preferable that the engine start is determined to be delayed if an elapsed time until an engine speed reaches a predetermined start determination engine speed is greater than a predetermined target start time. It is further preferable that the predetermined start determination engine speed is determined based on a coolant temperature. Preferably, the predetermined target start time is determined based on fuel temperature. It is preferable that the predetermined number of engine cycles is determined based on the counter value. It is further preferable the predetermined number of engine cycles is determined by a difference between the counter value and the predetermined reference value.

In another preferred embodiment of the present invention, the engine start control system comprises at least one sensor detecting engine operating conditions, an injector, and a control unit. The control unit controls the injector based on signals of the at least one sensor, and it is programmed to perform a control logic comprising determining whether an accumulated number of cases in which engine start is determined to be delayed is greater than a predetermined reference value and controlling the injector to not inject fuel for a predetermined number of engine cycles.

It is preferable that the at least one sensor comprises an engine speed sensor detecting an engine speed, and wherein the engine start is determined to be delayed if an elapsed time until an engine speed reaches a predetermined start determination engine speed is greater than a predetermined target start time.

It is further preferable that the at least one sensor further comprises a coolant temperature sensor detecting a coolant temperature, and wherein the predetermined start determination engine speed is determined based on a coolant temperature. Preferably, the at least one sensor further comprises a fuel temperature sensor detecting a fuel temperature, and wherein the predetermined target start time is determined based on a fuel temperature. It is preferable that the predetermined target start time is determined based on a fuel temperature. It is further preferable that the predetermined number of engine cycles is determined by a difference between the counter value and the predetermined reference value.

BRIEF DESCRIPTION OF THE DRAWINGS

The accompanying drawings, which are incorporated in and constitute a part of the specification, illustrate an embodiment of the invention, and, read together with the description, serve to explain the principles of the invention, where.

DETAILED DESCRIPTION OF PREFERRED EMBODIMENTS

Figure 1:
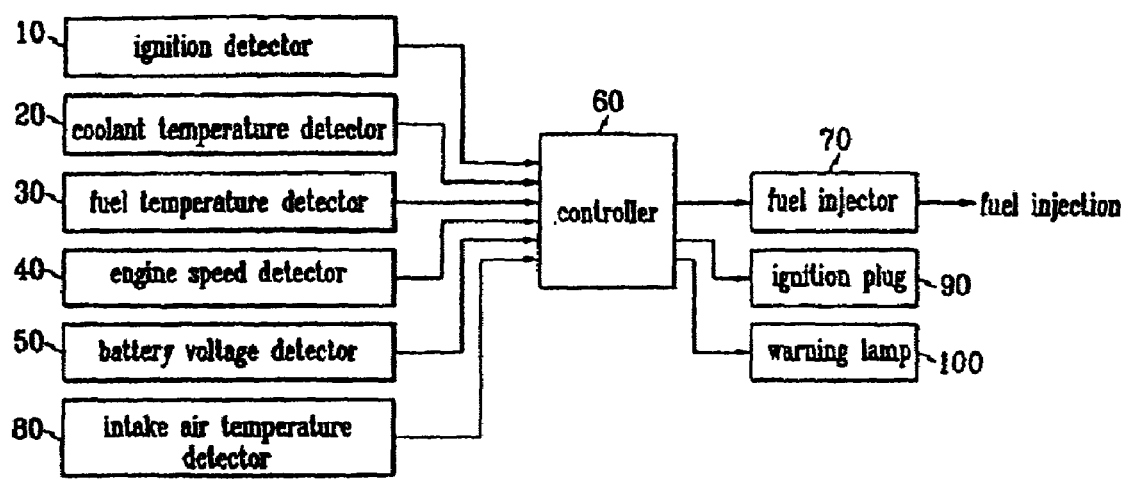
FIG. 1 is a schematic diagram of an engine start control system according to an embodiment of the present invention.

As shown in FIG. 1, an engine start control system comprises an ignition detector 10, a coolant temperature detector 20, a fuel temperature detector 30, an engine speed detector 40, a battery voltage detector 50, a controller 60, an intake air temperature detector 80, and a fuel injector 70. The ignition detector 10 detects a driver's manipulation of an ignition key and outputs a corresponding signal to the controller 60. That is, the ignition detector 10 can be a sensor for detecting whether an ignition switch is turned on.

The coolant temperature detector 20 detects a temperature of coolant circulating in an engine block and outputs a corresponding signal to the controller 60. The fuel temperature detector 30 detects a temperature of fuel inside a fuel supply line and outputs a corresponding signal to the controller 60. The engine speed detector 40 detects an engine rotational speed and outputs a corresponding signal to the controller 60. The battery voltage detector 50 detects a voltage of a battery of a vehicle and outputs a corresponding signal to the controller 60. The intake air temperature detector 80 detects a temperature of intake air and outputs a corresponding signal to the controller 60.

The controller 60 preferably includes a processor, a memory and other necessary hardware and software components as will be understood by persons skilled in the art, to permit the control unit to communicate with sensors and execute the control functions as described herein. The controller 60 is programmed to perform the engine start control method according to the embodiment of the present invention.

The fuel injector 70 is controlled by a signal of the controller 60 to inject fuel into a combustion chamber. An ignition plug 90 generates an ignition spark according to a control signal of the controller 60. An warning lamp 100 is controlled to be illuminated according to a control signal of the controller 60.

Figure 2:
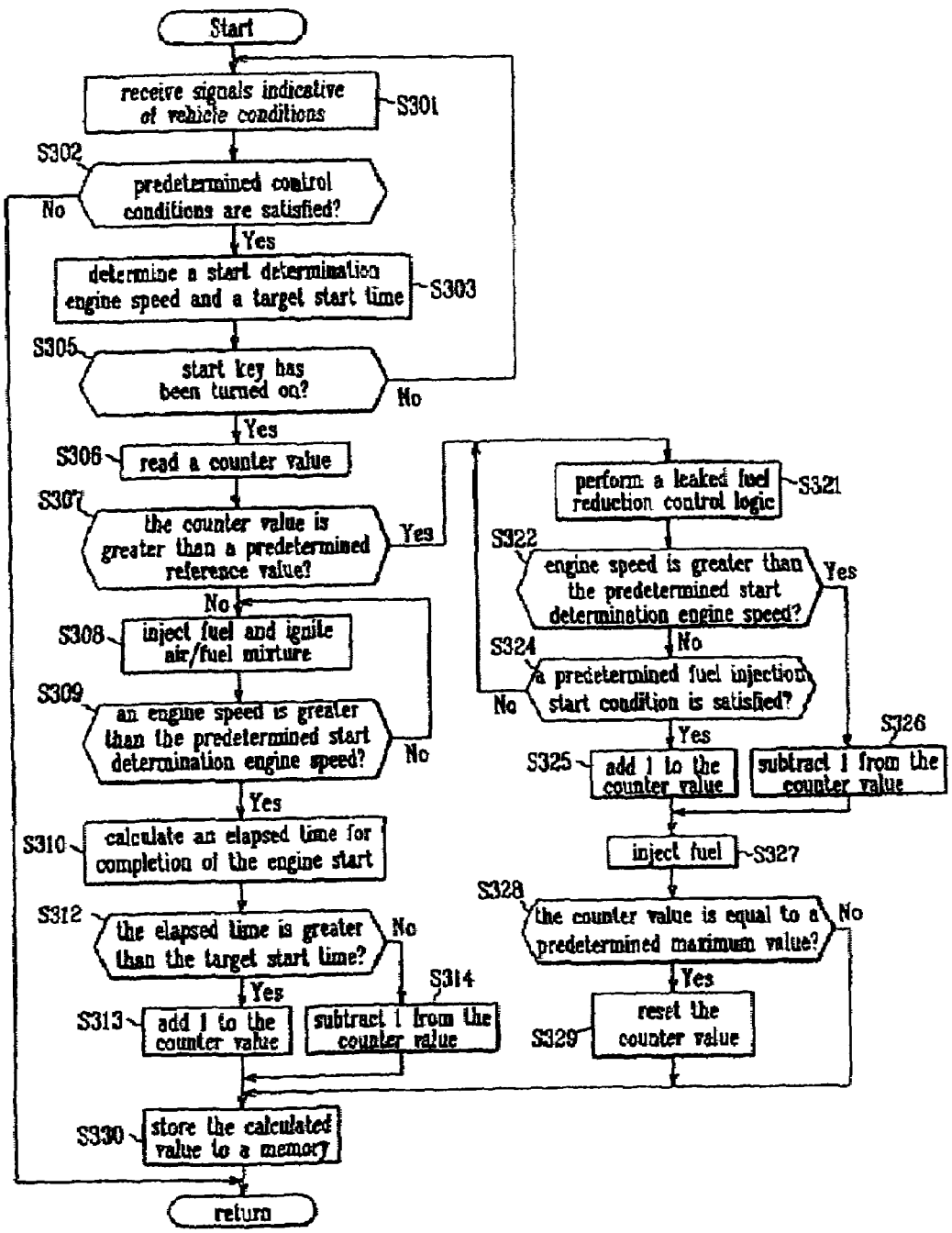
FIG. 2 is a flowchart showing an engine start control method according to an embodiment of the present invention.

Referring to FIG. 2, an engine start control method will be explained hereinafter. At first, the controller 60, in step S301, receives signals indicative of vehicle conditions from the various sensors, and determines, in step S302, whether predetermined control conditions are satisfied. The predetermined control conditions may include the sensor being in a normal state, each of differences between a coolant temperature, an intake air temperature, and a fuel temperature being less than a predetermined value, and a battery voltage being higher than a predetermined value. If it is determined that the predetermined control conditions are satisfied in step S302, the controller 60 determines a start determination engine speed and a target start time in step S303.

The start determination engine speed is preferably determined as a function of a coolant temperature, and the controller 60 can determine the start determination engine speed from a lookup table stored in a memory based on the coolant temperature. The target start time is preferably determined as a function of a fuel temperature, and the controller 60 can determine the target start time from a lookup table stored in a memory based on the fuel temperature. The target start time can be expressed as a number of engine cycles (or a number of ignitions) until engine start.

Next, in step S305, the controller 60 receives a signal from the ignition detector 10 and determines whether an start key has been turned on by a driver. If it is determined that the start key has been turned on in step S305, the controller 60 reads a counter value, which was calculated up to the previous engine driving cycle and stored in a memory, from the memory in step S306, and it is determined whether the counter value is greater than a predetermined reference value, in step S307. As an example, the predetermined value can be 10. Therefore, in step S307, it is determined whether the counter value is greater than 10.

If it is determined that the counter value is not greater than the predetermined value in step S307, the controller 60 controls the fuel injector 70 to inject an amount of fuel according to a normal fuel control logic and the ignition plug 90 to ignite the air/fuel mixture according to a normal control logic, in step S308.

Then, in step S309, the controller 60 determines whether an engine speed is greater than the predetermined start determination engine speed. That is, the controller 60 determines whether an engine start has been completed. If it is determined that the engine speed is not greater than the predetermined start determination speed in step S309, a control procedure returns to the step S308. On the other hand, if it is determined that the engine speed is greater than the predetermined start determination engine speed in step S309, that is, if it is determined that the engine start has been completed, the controller 60 calculates an elapsed time for completion of the engine start, in step S310. The elapsed time can be expressed as a number of engine cycles (or a number of ignitions) performed until the engine start is completed.

The controller 60, in step S312, determines whether the elapsed time is greater than the target start time. If it is determined that the elapsed time is greater than the target start time in step S312, the controller 60 adds 1 to the counter value in step S313. On the other hand, if it is determined that the elapsed time is not greater than the target start time in step S312, the controller 60 subtracts 1 from the counter value in step S314.

Then, in step S330, the controller 60 stores the calculated counter value to the memory. The stored counter value will be used in the next engine start control. If it is determined that the counter value is greater than the predetermined value in step S307, a leaked fuel reduction control logic is performed in step S321. When the counter value is greater than the predetermined value, it is determined that the air/fuel mixture becomes too rich because of leaked fuel. Accordingly, the leaked fuel reduction control logic for reducing the leaked fuel is performed.

In the leaked fuel reduction control logic, the fuel injector 70 is controlled to not inject fuel for a predetermined number of engine cycles. That is, under the leaked fuel reduction control logic, an engine operates in a state that fuel is not being injected. Because air is supplied to a combustion chamber by the operation of the engine, the air/fuel mixture in the combustion chamber becomes gradually leaner, so that the air/fuel mixture comes into a combustion range. Consequently, the engine can be started only by ignition without injecting fuel. At this time, the predetermined number of engine cycles for fuel not to be injected can be determined on the basis of the counter value. For example, the predetermined number of engine cycles can be determined as a difference between the counter value and the predetermined reference value used in step S307. That is, the predetermined number of engine cycles is preferably determined to be proportional to the counter value.

While the fuel is not injected, it is determined whether the engine speed reaches the predetermined start determination engine speed. If it is determined that the engine speed reaches the predetermined start determination engine speed without injecting the fuel, the counter value is decreased by 1, so that the number of engine cycles in which the fuel is not injected is decreased by 1 during the next engine start control. On the other hand, if it is determined that the engine speed does not reach the predetermined start determination engine speed without injecting the fuel, the counter value is increased by 1, so that the number of engine cycles in which the fuel is not injected is increased by 1 during the next engine start control. Consequently, after completely burning the leaked fuel, normal fuel injection is performed.

While the leaked fuel reduction control logic is performed, the controller 60 determines whether the engine speed is greater than the predetermined start determination engine speed in step S322. That is, it is determined whether the engine start has been completed. If it is determined that the engine speed is not greater than the predetermined start determination engine speed in step S322, the controller 60 determines whether a predetermined fuel injection start condition is satisfied in step S324.

The predetermined fuel injection start condition includes that a current number of engine cycles of an engine deactivation is greater than the predetermined number of engine cycles in which the fuel is not injected.

If it is determined that the predetermined fuel injection start condition is satisfied in step S324, the controller 60 adds 1 to the counter value in step S325. That is, if the engine start is not completed while the fuel is not being injected for the predetermined number of engine cycles, the number of engine cycles in which the fuel is not injected is increased by 1, so that the number of engine cycles in which the fuel is not injected is increased by 1 during the next engine start control. On the other hand, if it is determined that the engine speed is greater than the predetermined start determination engine speed in step S322, the controller 60 subtracts 1 from the counter value in step S326, so that the number of engine cycles in which the fuel is not injected is decreased by 1 during the next engine start control.

The controller 60 performs a normal fuel injection control based on an amount of intake air and various correction factors in step S327. The controller 60, in step S328, determines whether the counter value is equal to a predetermined maximum value. As an example, the predetermined maximum value can be 40. If it is determined that the counter value is equal to the predetermined maximum value in step S328, the counter value is reset and the warning lamp 100 for warning of a malfunction of the fuel injector is illuminated in step S329. That is, in such case, it is determined that the controller 60 let the driver check up the engines and replace the damaged fuel injector 70. After the step S329, the procedure proceeds to the step S330.

Figure 3:
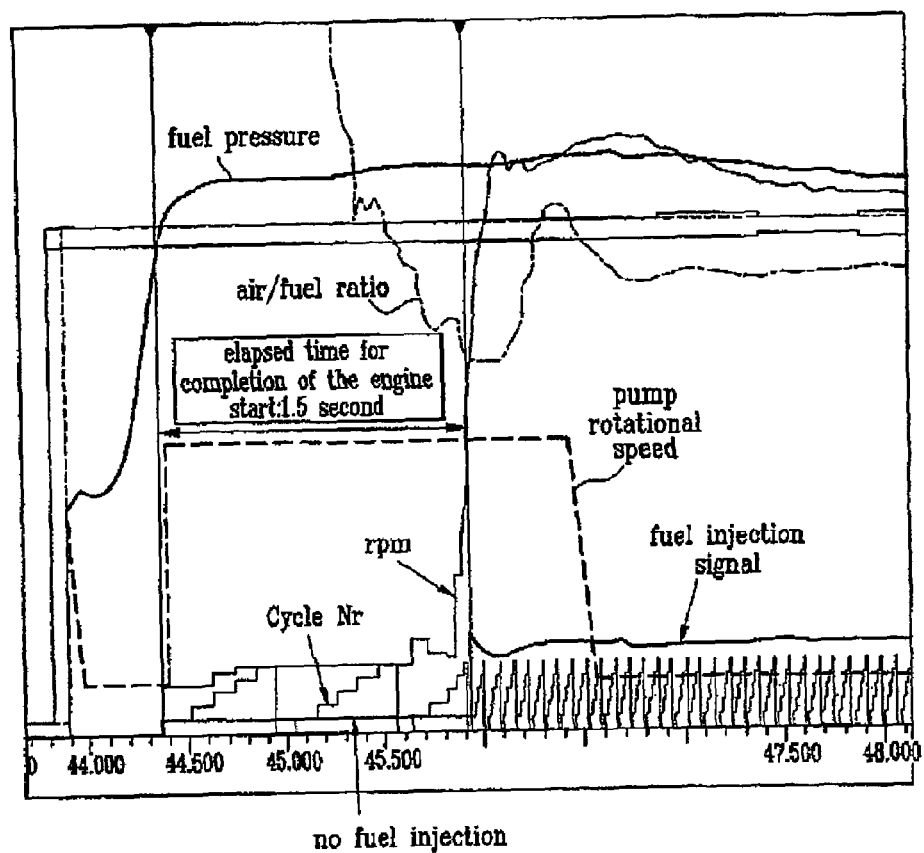
FIG. 3 shows a graph showing fuel injection control in the engine start control method according to an embodiment of the present invention.

According to the embodiment of the present invention, fuel injection is prohibited for a predetermined number of engine cycles, so that leaked fuel can be effectively removed. As shown in FIG. 3, during that period the air/fuel ratio is gradually decreased.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An engine start control method comprising:
    determining whether a predetermined control condition is satisfied;
    determining whether a counter value indicative of an accumulated number of engine start delays due to leaked fuel is greater than a predetermined reference value;
    injecting fuel and igniting air/fuel mixture until an engine speed reaches a predetermined start determination engine speed, if it is determined that the counter value is not greater than the predetermined reference value;
    determining whether an elapsed time for the engine speed to reach the predetermined start determination engine speed is greater than a predetermined target start time;
    increasing the counter value by 1 if the elapsed time is greater than the predetermined required starting time, and decreasing the counter value by 1 if the elapsed time is not greater than the predetermined target starting time; and
    performing a leaked fuel reduction control logic, if it is determined that the counter value is greater than the predetermined reference value.

2. The engine start control method of claim 1, wherein the predetermined control condition comprises a battery voltage being higher than a predetermined voltage and each of differences between a coolant temperature, an intake air temperature, and a fuel temperature being less than a predetermined value.

3. The engine start control method of claim 1, wherein the predetermined reference value of the accumulated number of engine start delays is 10.

4. The engine start control method of claim 1, wherein the predetermined start determination engine speed is determined based on a coolant temperature.

5. The engine start control method of claim 1, wherein the predetermined target start time is determined based on a fuel temperature.

6. The engine start control method of claim 1, wherein the leaked fuel reduction control logic comprises:
    controlling an injector to not inject fuel for a predetermined number of engine cycles of an injection deactivation;
    decreasing the counter value by 1, if an engine speed reaches the predetermined start determination engine speed during the predetermined number of engine cycles; and
    increasing the counter value by 1, if the engine speed reaches the predetermined start determination engine speed after the predetermined number of engine cycles.

7. The engine start control method of claim 6, wherein the predetermined number of engine cycles of the injection deactivation is determined based on the counter value.

8. The engine start control method of claim 7, wherein the predetermined number of engine cycles is determined by a difference between the counter value and the predetermined reference value.

9. The engine start control method of claim 6, wherein the leaked fuel reduction control logic further comprises:
    determining whether the counter value is equal to a predetermined maximum value; and
    resetting the counter value to 0 and warning of a malfunction of the injector, if it is determined that the counter value is equal to the predetermined maximum value.

10. An engine start control system comprising:
    an engine speed for sensor detecting an engine speed;
    an injector for injecting fuel; and
    a control unit for controlling the injector based on a signal of the engine speed sensor,
    wherein the control unit is programmed to perform a control method comprising:
    determining whether a predetermined control condition is satisfied;
    determining whether a counter value indicative of an accumulated number of engine start delays due to leaked fuel is greater than a predetermined reference value;
    injecting fuel and igniting air/fuel mixture until an engine speed reaches a predetermined start determination engine speed, if it is determined that the counter value is not greater than the predetermined reference value;
    determining whether an elapsed time for the engine speed to reach the predetermined start determination engine speed is greater than a predetermined target start time;
    increasing the counter value by 1 if the elapsed time is greater than the predetermined required starting time, and decreasing the counter value by 0 if the elapsed time is not greater than the predetermined target starting time; and
    performing a leaked fuel reduction control logic, if it is determined that the counter value is greater than the predetermined reference value.

11. The engine start control system of claim 10, further comprising:
    a battery voltage sensor detecting a battery voltage;
    a coolant temperature sensor detecting a coolant temperature; and
    a fuel temperature sensor detecting a fuel temperature,
    wherein the predetermined control condition comprises a battery voltage being higher than a predetermined voltage and each of differences between a coolant temperature, an intake air temperature, and a fuel temperature being less than a predetermined value.

12. The engine start control system of claim 10, wherein the predetermined reference value is 10.

13. The engine start control system of claim 10, further comprising a coolant temperature sensor detecting a coolant temperature, wherein the predetermined start determination engine speed is determined based on a coolant temperature.

14. The engine start control system of claim 10, further comprising a fuel temperature sensor detecting a fuel temperature, wherein the predetermined target start time is determined based on a fuel temperature.

15. The engine start control system of claim 10, wherein the leaked filet reduction control logic comprises:
   controlling the injector to not inject fuel for a predetermined number of engine cycles of an engine deactivation;
   decreasing the counter value by 1, if an engine speed reaches the predetermined start determination engine speed during the predetermined number of engine cycles; and
   increasing the counter value by 1, if the engine speed reaches the predetermined start determination engine speed after the predetermined number of engine cycles.

16. The engine start control system of claim 15, wherein the predetermined number of engine cycles is determined based on the counter value.

17. The engine start control system of claim 16, wherein the predetermined number of engine cycles is determined by a difference between the counter value and the predetermined reference value.

18. The engine start control system of claim 15, wherein the leaked fuel reduction control logic further comprises:
   determining whether the counter value is equal to a predetermined maximum value; and
   resetting the counter value to 0 and warning of a malfunction of the injector, if it is determined that the counter value is equal to the predetermined maximum value.

19. An engine start control method comprising:
   determining whether an accumulated number of cases in which engine start is determined to be delayed is greater than a predetermined reference value; and
   controlling an injector to not inject fuel for a predetermined number of engine cycles.

20. The engine start control method of claim 19, wherein the engine start is determined to be delayed if an elapsed time for an engine speed to reach a predetermined start determination engine speed is greater than a predetermined target start time.

21. The engine start control method of claim 20, wherein the predetermined start determination engine speed is determined based on a coolant temperature.

22. The engine start control method of claim 20, wherein the predetermined target start time is determined based on a fuel temperature.

23. The engine start control method of claim 19, wherein the predetermined number of engine cycles of the injection deactivation is determined based on a counter value.

24. The engine start control method of claim 23, wherein the predetermined number of engine cycles is determined by a difference between the counter value and the predetermined reference value.

25. An engine start control system comprising:
   at least one sensor for detecting engine operating conditions;
   an injector for injecting fuel; and
   a control unit for controlling the injector based on signals of the at least one sensor,
   wherein the control unit is programmed to perform a control logic comprising:
   determining whether an accumulated number of cases in which engine start is determined to be delayed is greater than a predetermined reference value; and
   controlling the injector to not inject fuel for a predetermined number of engine cycles.

26. The engine start control system of claim 25, wherein the at least one sensor comprises an engine speed sensor detecting an engine speed, and wherein the engine start is determined to be delayed if an elapsed time for an engine speed to reach a predetermined start determination engine speed is greater than a predetermined target start time.

27. The engine start control system of claim 26, wherein the at least one sensor further comprises a coolant temperature sensor detecting a coolant temperature, and wherein the predetermined start determination engine speed is determined based on a coolant temperature.

28. The engine start control system of claim 26, wherein the at least one sensor further comprises a fuel temperature sensor detecting a fuel temperature, and wherein the predetermined target start time is determined based on a fuel temperature.

29. The engine start control system of claim 26, wherein the predetermined target start time is determined based on a fuel temperature.

30. The engine start control system of claim 29, wherein the predetermined number of engine cycles is determined by a difference between a counter value and the predetermined reference value.

* * * * *